United States Patent [19]

Schreiber

[11] Patent Number: 5,285,470
[45] Date of Patent: Feb. 8, 1994

[54] METHODS OF NOISE-REDUCED AND BANDWIDTH-REDUCED TELEVISION TRANSMISSION

[75] Inventor: William F. Schreiber, Cambridge, Mass.

[73] Assignee: Massachusetts Institute of Technology, Cambridge, Mass.

[21] Appl. No.: 898,309

[22] Filed: Jun. 15, 1992

Related U.S. Application Data

[63] Continuation of Ser. No. 730,270, Jul. 12, 1991, Pat. No. 5,127,021.

[51] Int. Cl.⁵ .................. H04L 27/30; H04N 5/38; H04N 5/40; H04N 5/44
[52] U.S. Cl. .................................. 375/1; 380/34; 348/473; 348/384; 348/725; 348/723
[58] Field of Search ............... 358/12, 13, 15, 141, 358/142, 186, 188

[56] References Cited

U.S. PATENT DOCUMENTS

| | | | |
|---|---|---|---|
| 4,890,283 | 12/1989 | Tsinberg et al. | 375/1 X |
| 4,907,087 | 3/1990 | Schreiber | 358/186 |
| 4,912,721 | 3/1990 | Pidgeon, Jr. et al. | 375/1 |

OTHER PUBLICATIONS

P. P. Vaidyanathan, "Quadrature Mirror Filter Banks, M-Band Extensions and Perfect-Reconstruction Techniques" IEEE ASSP Magazine, Jul. 1987, pp. 4–20.

G. K. Wallace, "Overview of the JPEG Still Picture Compression Algorithm", Digital Equipment Corporation, pp. 66–71.

Schreiber, William F., U.S. Ser. No. 07/257,402, filed Oct. 13, 1988, entitled "Reliable Television Transmission Through Analog Channels".

Baylon, David Michael, "Adaptive Amplitude Modulation for Transform/Subband Coefficients", Massachusetts Institute of Technology, Jun, 1990, pp. 1–104.

Chow, Warren H. "Methods to Improve Spatiotempoal Adaptive Amplitude Modulation for Video Transmission", Massachusetts Institute of Technology, Feb. 1990, pp. 1–79.

Ziv, Jacob et al., "A Universal Algorithm for Sequential Data Compression", IEEE Transactions on Information Theory, vol. IT-23, No. 3, May 1977, pp. 337–343.

Haber, Conrad H. et al., "Analog Versus Digital Antijam Video Trandmission", IEEE Transactions on Communications, vol. COM-25, No. 3, Mar. 1977, pp. 310–317.

ARPA Annual Technical Reports, "Image Transmission Via Spread Spectrum Techniques", Jan. 1978, pp. 1–411.

Pickholtz, Raymond L. et al., "Theory of Spread-Spectrum Communications-A Tutorial", IEEE Transactions on Communications, vol. Com-30, No. 5, May 1982, pp. 855–884.

Scholtz, Robert A., "The Spread Spectrum Concept", IEEE Transactions on Communications, vol. Com-25, No. 8, Aug. 1988, pp. 748–755.

*Primary Examiner*—Bernarr E. Gregory
*Attorney, Agent, or Firm*—Fish & Richardson

[57] ABSTRACT

A noise-reduced method of transmitting a video signal including separating the video signal into a plurality of frequency subbands representing a corresponding plurality of subband images, each of which is made up of a corresponding array of blocks of samples; for a preselected one of the subband images, measuring the busyness of each of the blocks of that subband image; for the preselected subband image, assigning each of the blocks of that subband image to one of a plurality of groups, the plurality of groups including a group of more busy blocks and a group of less busy blocks; adaptively modulating the samples of the selected subband image by multiplying the selected subband image by a set of adaptive modulation factors, wherein a greater quantity of adaptive modulation factors is used for the blocks assigned to the group of more busy blocks as compared to the blocks assigned to the group of less busy blocks; and transmitting the adaptively modulated selected subband image along with the set of adaptive modulation factors corresponding thereto.

33 Claims, 6 Drawing Sheets

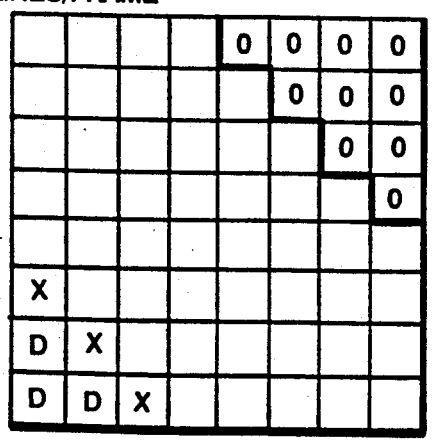
FIG. 8
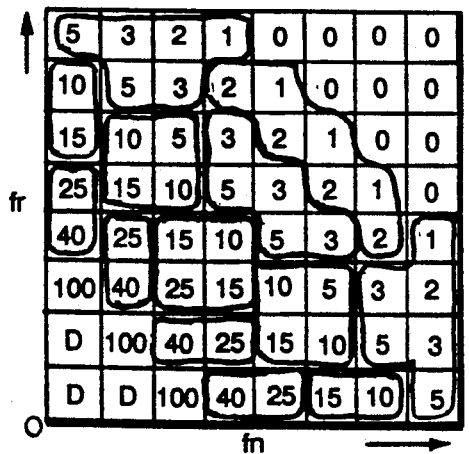
FIG. 9
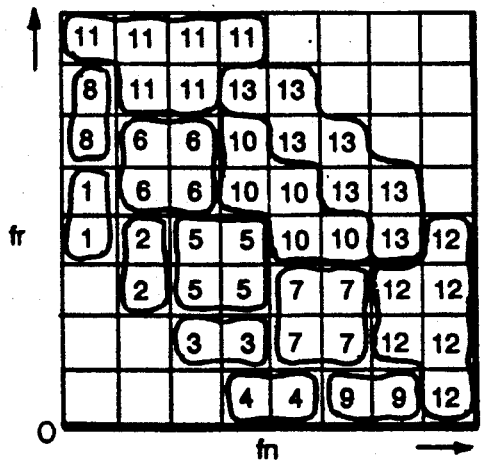
FIG. 10
FIG. 11
FIG. 12
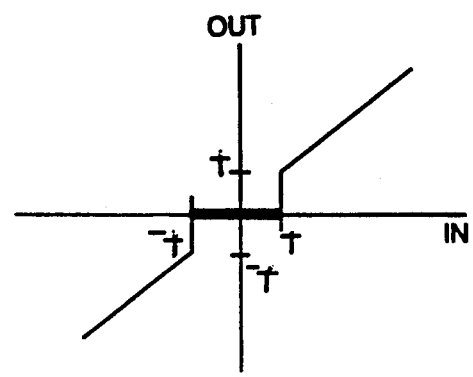
FIG. 15

METHODS OF NOISE-REDUCED AND BANDWIDTH-REDUCED TELEVISION TRANSMISSION

BACKGROUND OF THE INVENTION

This is a continuation of U.S. patent application Ser. No. 07/730,270 filed Jul. 12, 1991, entitled "Spread Spectrum Television Transmission", now U.S. Pat. No. 5,127,021.

The invention relates to high definition television (HDTV) and to spread spectrum communication systems.

The United States is in the process of setting a standard for high-definition television transmission in the same terrestrial broadcasting (over-the-air) channels now used for transmitting standard (known in the US and some other countries as NTSC) television. This plan is quite different from the intentions in Europe and Japan, in which HDTV will be delivered only by satellite transmission (DBS).

There are two important differences that affect the system design. DBS provides a "clean" channel, essentially free of ghosts and interference, and with a guaranteed minimum signal level. Terrestrial broadcasting is typically impaired by ghosts, noise, interference, and frequency distortion. These characteristics and impairments set the practical limit to picture quality in typical homes, and they also affect the number of channels that can be used in any one area (10 to 20) as compared with the total number of channels allocated for television (about 68). In addition, terrestrial spectrum is in very short supply. There are many more claimants for spectrum assignments than can be accommodated by the regulatory authorities. Consequently, these authorities are very much concerned with the spectrum efficiency of proposed HDTV systems. For this application, spectrum efficiency refers to the number of different TV programs of a given technical quality that can be provided to each viewer within a given overall allotment of spectrum.

It is inherent in terrestrial broadcasting, due to the operation of the inverse-square law, that the signal power level, and therefore the CNR (carrier/noise ratio), drops rapidly as one goes further from the transmitter. Since the theoretical capacity of the channel to deliver information is proportional to the bandwidth times the CNR (in dB), it is necessary to deliver more information, and hence a better picture, to close-in receivers in order to achieve efficient utilization of channel capacity. All current analog systems do this as a matter of course. Systems that do not have a graceful degradation of image quality with worsening CNR inherently waste bandwidth in the central cities, precisely where a spectrum shortage is developing due to the rapid growth of mobile services.

Recently, several all-digital HDTV systems have been proposed. All of them deliver about 20 Mb/s to all viewers, and all have a very sharp threshold, below which no reception at all is obtained. This sharp threshold is due to the very rapid increase in bit error rate (BER) as a function of CNR. Typically, the BER increases by a factor of 10 with a 1-dB drop in CNR. No known scheme of error protection can overcome this effect and still maintain good transmission efficiency.

An alternative is to use some form of progressive transmission in which the transmitted signal is divided into a number of data streams that are transmitted at different effective power levels, using frequency division (FD) or time division (TD). The higher the CNR, the more data streams are recovered, and the better the picture. While these methods are in the right direction, they are not very efficient, since, at most levels of CNR, one or more of the data streams is being delivered at excess CNR, and therefore wastefully. In addition, since this class of schemes uses FD or TD, there is a fixed upper limit of image quality, and there is no convenient way to upgrade the system over time.

SUMMARY OF THE INVENTION

In general, in one aspect, the invention features a spread spectrum transmission system for transmitting a television signal. The transmission system includes means for dividing the television signal into frequency components; means for grouping at least some of the frequency components into blocks, the grouping based upon the distance that each of the frequency components is from the origin in the frequency plane; means for generating a spread spectrum signals, each of which is generated from a different one or more of the blocks; means for combining more than one of the spread spectrum signals to form a combined signal; and a transmitter which receives the combined signal and generates a transmission signal therefrom.

In general, in another aspect, the invention features a television receiver for receiving a television transmission signal that was derived from a television signal. The receiver includes means for multiplying a received signal by each member of a set of pseudorandom sequences to generate a plurality of signal components; means for calculating whether a selected member of the plurality of signal components will improve picture quality if used in reconstructing the video signal; means for selecting at least some of the plurality of signal components based upon the calculations of the determining means; and means for generating a reconstructed television signal from the selected signal components.

In general, in yet another aspect, the invention features a noise-reduced method of transmitting a video signal including the steps of separating the video signal into frequency subbands representing corresponding subband images, and each of which is made up of a corresponding array of blocks of samples; for a preselected one of the subband images, measuring the busyness of each of the blocks of that subband image; for the preselected one of the subband images, assigning each of the blocks of that subband image to one of a plurality of groups, the plurality of groups including a group of more busy blocks and a group of less busy blocks; adaptively modulating the samples of the selected subband image by multiplying the selected subband image by a set of adaptive modulation factors, wherein a greater quantity of adaptive modulation factors is used for the blocks assigned to the group of more busy blocks as compared to the blocks assigned to the group of less busy blocks; and transmitting the adaptively modulated selected subband image along with the set of adaptive modulation factors corresponding thereto.

Preferred embodiments include the following features. The frequency subband components are spatiotemporal frequency subband components, the preselected subband image is devoid of any DC signal components, and the blocks are of uniform size, each consisting of a 4×4 array of samples. The step of assigning is performed so that the total number of adaptive modulation factors in the set of adaptive modulation factors is no greater than a predetermined value. The the step of adaptively modulating uses one adaptive modulation factor per block for the samples of less busy blocks and one adaptive modulation factor per sample for the samples of more busy blocks. The busyness is measured by measuring the RMS value of the signal within a block. The noise-reduced method further includes adaptively modulating other subband images from the plurality of subband images by using adaptive modulation factors that are derived from the set of adaptive modulation factors. The noise-reduced method also includes scrambling the samples of the adaptively modulated subband image before transmitting them.

In general, in still another aspect, the invention features a noise-reduced method of transmitting a video signal including separating the video signal into frequency subbands representing corresponding subband images, each of which is made up of a corresponding array of blocks of samples; organizing the frequency subbands into more than one collection; for each of the collections and for a preselected one of the subband images within that collection, measuring the busyness of each of the blocks of the preselected subband image in that collection; for each of the preselected subband images, assigning each of the blocks of that selected subband image to one of a plurality of groups, the plurality of groups including a group of more busy blocks and a group of less busy blocks; for each of the preselected subband images, adaptively modulating the samples of the selected subband image by multiplying the selected subband image by a corresponding set of adaptive modulation factors, wherein a greater quantity of adaptive modulation factors is used for the blocks assigned to the group of more busy blocks as compared to the blocks assigned to the group of less busy blocks; and transmitting the adaptively modulated selected subband images along with the sets of adaptive modulation factors corresponding thereto.

In general, in another aspect the invention features a method of processing a noise-reduced, transmitted video signal including receiving adaptively modulated subband images, each of which is made up of an array of blocks of samples; receiving adaptive modulation information for a selected one of adaptively modulated subband images; from the adaptive modulation information, extracting a set of adaptive demodulation factors and directions on how the set of adaptive demodulation factors are to be applied to the selected adaptively modulated subband image to undo the adaptive modulation; using the adaptive modulation information t0 identify which of the blocks in the selected adaptively modulated subband image belong to a group of more busy blocks and which of the blocks belong to a group of less busy blocks; and adaptively demodulating the selected adaptively modulate subband image by using the set of adaptive demodulation factors. The step of adaptively demodulating includes, for the blocks in the group of more busy blocks, using a greater quantity of the set of adaptive demodulation factors per block to adaptively demodulate as compared to the blocks in the less busy group.

Preferred embodiments include the following features: The method also includes adaptively demodulating each of the other of the plurality of adaptively modulated subband images in the same way as the selected adaptively modulated subband image is adaptively demodulated and by using the adaptive modulation information for the selected one of the plurality adaptively modulated subband images. The step of adaptively demodulating includes using one adaptive demodulation factor per block for the samples of less busy blocks and using one adaptive demodulation factor per sample for the samples of more busy blocks.

In general, in still another aspect, the invention features a bandwidth-reduced method of transmitting a video signal including separating the video signal into a plurality of frequency subbands representing a corresponding plurality of subband images, each of which is made up of a corresponding array of subband image samples; separating the plurality of subbands into groups; for a selected one of said groups, deriving adaptive selection rules for adaptively selecting subband image samples of one of the subbands of the selected group, the adaptive selection rules derived from all of the subbands of the selected group; and using the derived adaptive selection rules to adaptively select subband image samples in all subbands of the selected group.

In preferred embodiments, the deriving step includes for each of the members of the selected group, generating preliminary selection rules for selecting the samples of that member; and taking the logical OR of the preliminary selection rules for all of the members of the selected group; wherein the derived selection rules are derived from the logical OR of the preliminary selection rules for all of the members of the selected group. Each of the groups is formed by one or more subbands that are adjacent to each other in frequency space. The bandwidth-reduced method also includes for each of the subbands, generating preliminary selection rules for selecting the samples of that subband, and wherein the step of separating the subbands into groups is done so as to group together subbands having similar percentages of selected samples. The method further includes scrambling the selected samples before transmitting them.

In general, in a further aspect, the invention features a bandwidth-reduced method of transmitting a video signal including separating the video signal into a plurality of frequency subbands representing a corresponding plurality of subband images, each of which is made up of a corresponding array of subband image samples; dividing a selected one of the subband images into a plurality of blocks of uniform size; adaptively selecting the samples of the selected subband image; categorizing the blocks of the plurality of blocks into at least three categories including a first category, a second category and a third category, the first category including blocks having a number of adaptively selected samples less than a first threshold, the third category including blocks having a number of adaptively selected samples greater than a second threshold, and the second category including blocks having a number of selected samples that is at least as great of the first threshold and no greater than the second threshold; and transmitting the selected samples of the blocks within the second category using a code that uniquely identifies the pattern of selected samples in each block.

Preferred embodiments include the following features. The method also includes transmitting none of the samples of the blocks in the first category and transmitting all of the samples of the blocks within the third category. Each block is a 3×3 block of samples, the first threshold is equal to two samples, and the second threshold is equal to three samples. The method also includes identifying which of the first and third categories has the most number of blocks, and then transmitting the blocks of the category having the most blocks by using a compression code, e.g. a Ziv Lengel cole. All of the blocks in the second category and all of th blocks from whichever of the first and third categories has the least number of blocks are transmitted together using a unique code for each distinct pattern.

One advantage of the invention is that it enables one to design a high-definition TV system of maximum spectrum efficiency, i.e., which delivers close to the maximum number of programs of a given technical quality to each viewer within a minimum overall spectrum allocation. In addition, a system that uses the invention delivers close to the maximum possible quality to each viewer, taking account of the local CNR as well as the assigned bandwidth, and it transmits a video image that degrades gracefully as transmission conditions deteriorate.

The invention also enables one to build a TV broadcasting system that can be improved over time in a non-disruptive manner, i.e., without requiring replacement of existing HDTV receivers or of existing HDTV studio equipment and transmitters. A TV system that incorporates the invention can be tailored to the local interference situation, so that close to the maximum possible quality images are received taking into account interference from and to other stations.

The invention facilitates the design of receivers for an HDTV system in which lower-resolution images can be produced at lower cost by recovering less than all of the transmitted signal data. The invention also facilitates the design of low-cost converters to convert the HDTV signal into one that can be viewed on a standard receiver, such as intended for NTSC.

Other advantages and features will become apparent from the following description of the preferred embodiment and from the claims.

DESCRIPTION OF THE PREFERRED EMBODIMENT

FIG. 8 illustrates an 8×8 decomposition of the television signal in the spatial frequency plane;

FIG. 9, illustrates an average selection rate for each of the subbands in the spatial frequency plane;

FIG. 10 illustrates a grouping of subbands based upon average selection rates;

FIG. 11 shows the magnitude of the frequency of the components used to generate the signal groupings for the direct-sequence encoder;

FIG. 12 illustrates a plan for generating the order of component groupings for the direct-sequence encoder;

FIG. 15 is the transfer function of the thresholding circuit.

STRUCTURE AND OPERATION

For the purposes of this application, spread spectrum (SS) means a method of multiplexing N signals into a single transmission channel, sometimes called code division multiple access (CDMA) as an alternative to frequency division multiple access (FDMA) or time division multiple access (TDMA). In the latter schemes, the sum of the bandwidths of the N signals is equal to or less than the channel bandwidth. In TDMA, each signal is time-compressed by a factor of N, raising its bandwidth to that of the channel, and the signals are transmitted in sequence. The ensemble of signals thus occupies all of the time and all of the bandwidth. In FDMA, each signal is transmitted in a separate frequency channel, so that the ensemble of signals has a total bandwidth equal to that of the channel. In both cases, any one signal uses either 1/Nth of the time or 1/Nth of the bandwidth. In spread spectrum, each component uses all of the bandwidth and all of the time; the signals are separated by coding. Each signal is exanded to the full channel bandwidth by multiplying each signal sample by a pseudo-random sequence of length N whose clock rate is twice the channel bandwidth in Hz. There are exactly N orthogonal sequences of length N. All such products are added together and transmitted in the channel.

What has just been described is a baseband system. For RF transmission by quadrature amplitude modulation, two sum-of-products signals are produced, each comprising half of the samples and half the channel bandwidth. These two signals are then modulated in quadrature on a single carrier. For systems more advanced than quadrature modulation, such as trellis coding, a more complicated scheme is used, but the general idea is the same.

OVERVIEW OF TRANSMITTER

Figure 1:
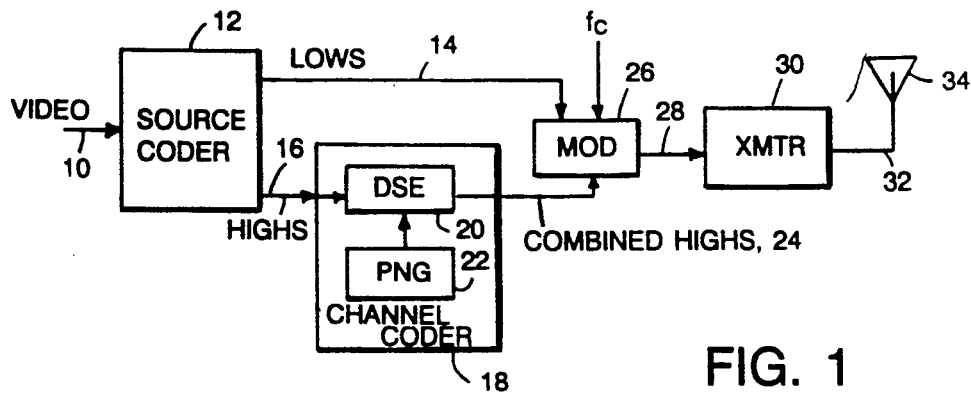
FIG. 1 is a high-level block diagram of a television encoder/transmitter.

FIG. 1 is a high-level block diagram of a basic embodiment of the system. The description does not include required synchronization and storage elements and it does not specify whether individual signals are in digital or analog form. Such details would be obvious to those skilled in the art.

An original video signal 10 is input to a source coder 12, which produces two classes of output signals, namely a coded "lows +" signal 14 and coded "highs" signals 16. Coded "lows +" signal 14, which includes the low frequency components of television signal plus certain data required for decoding, is transmitted essentially without error. Coded highs signals 16, which represent the high frequency components of the video signal and which typically have zero average value, may suffer some error in transmission and still be useable.

Coded highs signals 16 are transmitted by spread spectrum. That is, each such sample of such components is multiplied by a pseudorandom (PN) sequence of length N, where N is such as to expand the bandwidth of each stream of samples to be the full channel bandwidth (or half the channel bandwidth if a quadrature amplitude modulation (QAM) system is used). Coded highs signals 16 pass to a channel coder 18, which includes a direct-sequence encoder (DSE) 20 and a pseudorandom sequence generator (PNG) 22. PNG 2 generates the group of pseudorandom sequences (PN). Direct-sequence encoder (DSE) 20 multiplies each of coded highs signals 16 by a unique pseudorandom (PN) sequence to generate product signals that are then combined to produce a sum-of-products signal 24. More specifically, the product signals are added together with different power levels, generally with higher power being used for lower-frequency components. Thus, in general, the lower-frequency components among coded highs signals 16 are transmitted with relatively larger amplitudes.

A modulator 26 accepts sum-of-products signal 24 plus coded "lows +" signal 14 as well as a carrier frequency, $f_c$, and produces a modulated carrier 28, which is input to a transmitter 30. Generally, transmitter 30 is simply a frequency shifter and amplifier that produces a high-frequency modulated signal 32, which is directed to a transmitting antenna 34.

By using spread spectrum, it is possible to generate a transmitted signal that looks like white random noise. Such a signal is particularly useful since, for a given transmitted power, this minimizes the visibility of interference into other signals in the same or adjacent channels. Scrambling of the samples of the original components before the spread spectrum operation guarantees that the crosstalk and interference depend only on the average signal levels, and not the peak signal levels.

Note that when binary digital signals are used in spread spectrum, the "multiplication" process is actually the exclusive-or process, and the PN sequence has the logical values 1 and 0. When analog or multilevel "digital" signals are used, the PN sequence has the values $+/-1$ and the operation is ordinary multiplication.

OVERVIEW OF RECEIVER

Figure 2:
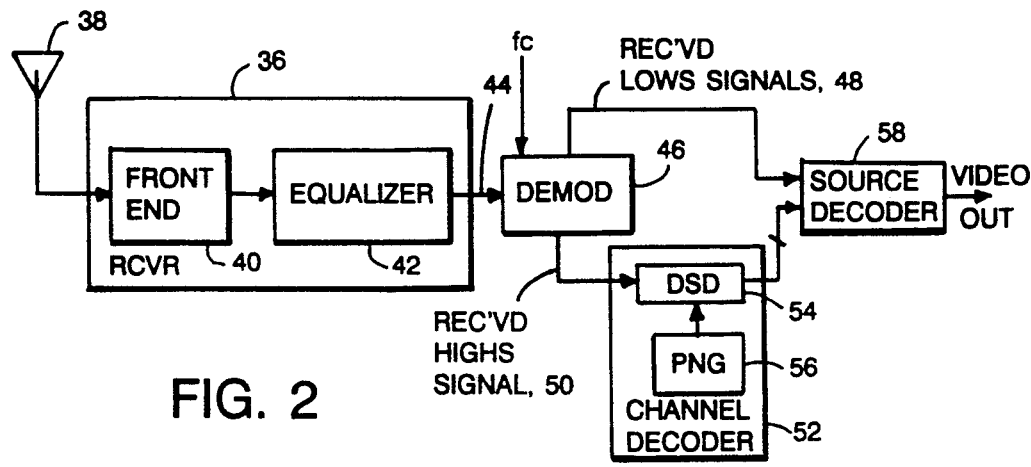
FIG. 2 is a high-level block diagram of a television decoder/receiver.

Referring to FIG. 2, at the receiving end, a television receiver 36 accepts the received signal from a receiving antenna 38. In receiver 36, a front end 40 frequency shifts and amplifies the received signal and a channel equalizer 42, if used, compensates for frequency distortion (e.g., multipath). The output of receiver 36 (i.e., signal 44) is, ideally, a replica of modulated carrier signal 28 (See FIG. 1), which has passed through a channel equivalent to an ideal bandpass filter and which has had a certain amount of random noise added to it. Signal 44 is demodulated in a demodulator 46 to produce received lows signal 48 and received highs signal 50, which are approximations of the corresponding lows signals 14 and sum-of-products signal 24, respectively, at the sending end. Demodulator 46 recovers the carrier frequency and perhaps other synchronizing signals by using techniques well known to those skilled in the art.

At the receiver, the sum-of-products signal within the transmitted signal is multiplied by each of the PN sequences in turn and integrated over the period of one sample. If the N sequences are mutually orthogonal, only one signal is recovered by each demodulation process; there is no crosstalk.

Received highs signal 50 is then separated into its original components by a channel decoder 52. Channel decoder 52 includes a direct-sequence decoder (DSD) 54 and a PN generator 56 which generates the same PN sequences that were used at the sending end. With suitable filtering (e.g., integration over one sample duration), the original samples are recovered. Received lows signal 48 and the output of DSD 54 then pass to a source decoder 58 which produces a replica of the input video signal, although, in general, noisier and perhaps of lower resolution, depending on channel conditions. As will be described in greater detail later, some scheme is used to judge the noisiness of the recovered components to establish whether their use in signal reconstruction will improve image quality and only those that improve image quality are utilized. With such a procedure, recovered image quality improves with CNR at the receiver, since more and more components are usable at higher and higher CNR.

Note that the noise in the recovered signal depends only on channel noise. In the white-noise case if all products are added with equal weight, CDMA produces the same recovered SNR for each component as do TDMA and FDMA, i.e., the SNR is equal to the channel CNR. However, CDMA has two capabilities not possessed by FDMA and TDMA. In addition to the N orthogonal sequences, there are many other sequences of the same length that are nearly orthogonal. (In the case of very long sequences, almost all possible sequences are nearly orthogonal.) Thus, additional components can be multiplexed at the cost of some small loss of recovered SNR.

In addition, the product signals in the transmitter can be added with different relative amplitude, so that the relative SNR of the signals at the receiver can be adjusted. This is highly advantageous in TV since all components do not require the same SNR. When different amplitudes are used for the various products in such a way as to maintain the total transmitted power, then the SNR of some components is raised while that of others is lowered, thus producing a substantial improvement in perceived SNR of the reconstructed image. In addition, when it is desired to add components in order to raise the spatial resolution, very little power is required for these additional components as they do not require high SNR at the receiver. Thus, there is little loss of overall perceived SNR.

SOURCE CODER

The invention is applicable to TV source-coding schemes that divide the signal into a number of frequency components, and in which some or all (typically not including the lowest-frequency components) of these components are of the type in which small errors in amplitude produce correspondingly small deterioration of image quality.

Source coder 12 divides the video signal 10 into a group of spatial or spatiotemporal frequency components or subbands. It may use any of a number of techniques known to those skilled in the art. In the described embodiment, source coder 12 uses a filter bank in which the filters are quadrature-mirror filters such as are described by P.P. Vaidyanathan, in "Quadrature Mirror Filter Banks, M-Band Extensions and Perfect Reconstruction Techniques," IEEE ASSP Magazine (July, 1987) pp. 4–20. These filters have the advantage that the sum of the data rates for the sampled filter outputs (i.e., frequency components) is the same as the data rate for the original signal. Unless the filters have infinitely sharp cutoff characteristics, which is neither possible nor desireable, the subbands will overlap in frequency and therefore there will be aliasing in each component. This aliasing due to the operation of the analysis filter bank is exactly cancelled in the synthesis filter bank that is used to reconstruct the signal at the receiver.

Note that the discrete cosine transform (DCT) is a special case of subband coding in which the image is divided into blocks, typically $8 \times 8$ picture elements, before transformation. DCT coefficients correspond exactly to subband samples if a particular set of analysis and synthesis filters is used. Thus, hereinafter, when the word "sample" is used, it is to be considered interchangeable with "coefficient".

DIRECT-SEQUENCE ENCODER

Figure 3:
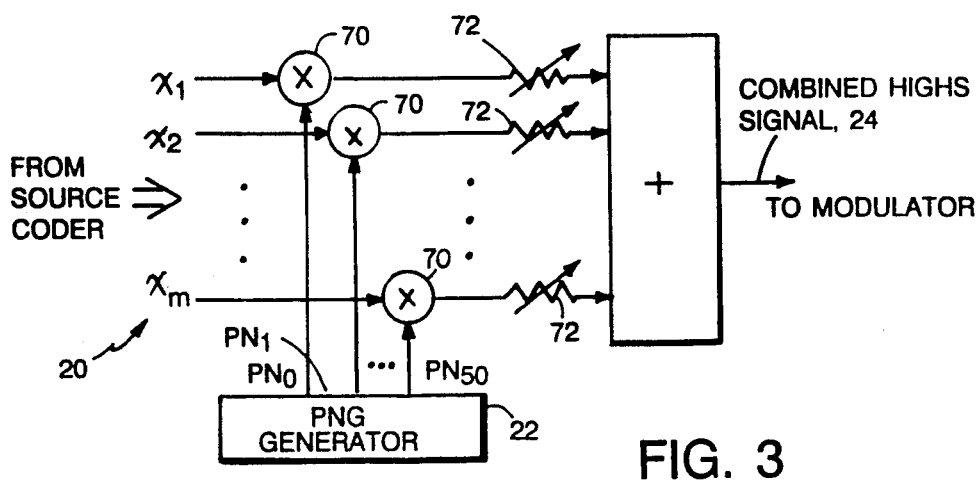
FIG. 3 is a block diagram of a direct-sequence encoder.

Referring to FIG. 3, direct-sequence encoder (DSE) 20 processes the m highs components or samples, $x_1$ through $x_m$, that are produced by source coder 12. Each train of samples, $x_i$, passes to an associated multiplier 70 where it is multiplied by a different unique one of a group of pseudorandom sequences, $\{PN_i\}$, generated by PNG generator 22. Each pseudorandom sequence $PN_i$ is of length N, is a member of a set of orthogonal sequences, and has a clock rate that is twice the channel bandwidth in Hz (Note that there are exactly N orthogonal sequences of length N.) Multiplying each signal sample by a pseudorandom sequence expands the signal to the full channel bandwidth.

The output of each multiplier 70 passes to a weighting circuit 72 that multiplies the product by an appropriate weight. In other words, the products (i.e., the outputs of multipliers 70) are assigned different power levels, generally with higher power being used for lower-frequency components. The weighting process is symbolized here by adjustable resistors, but any appropriate means may be used to achieve the desired weighting. The weighted signals are then combined in an adder 74 to produce a weighted sum-of-products signal (i.e., sum-of-products signal 24 shown in FIG. 1) which passes to the modulator.

DIRECT-SEQUENCE DECODER

Figure 4:
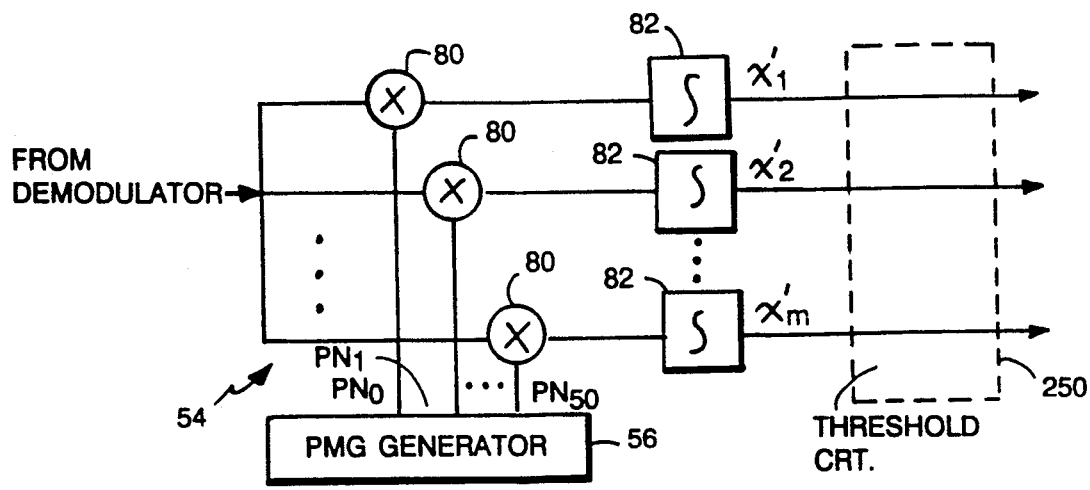
FIG. 4 is a block diagram of a direct-sequence decoder.

Referring to FIG. 4, direct-sequence decoder (DSD) 54 processes the output of the demodulator in the receiver to generate the m frequency components that were sent. The output of the demodulator including the sum-of-products signal is input to m multipliers 80, one for each of the frequency components which is to be extracted from the received signal. In each multiplier 80, the demodulated signal is multiplied by a different one of the pseudorandom sequences $\{PN_i\}$ that were used in DSE 20. Each of the resulting product signals is then integrated by integrators 82 for a period equal to one pseudorandom sequence length. Each integrator 80 applies a weight that is the reciprocal of the weight applied by weighting circuits 72 in DSE 20 Thus, to the degree that the sequences are orthogonal, each multiplier 80 plus integrator 82 combination picks out one of the original trains of samples from the demodulated signal, producing signal $x'_i$, which is a replica of the corresponding signal $x_i$ at the encoder, but with the addition of some noise.

MODULATOR AND DEMODULATOR CIRCUITS

Figure 5:
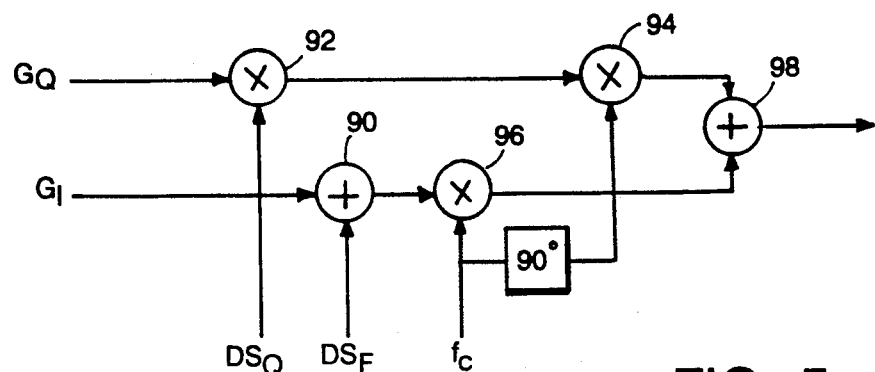
FIG. 5 is a block diagram of a modulator circuit.

FIG. 5 shows a typical quadrature modulator that may be used in the system. If such a modulator is used, the product signals produced by multiplying the frequency components by the corresponding PN sequences are weighted appropriately and then placed into two equal-sized groups, identified as $G_I$ and $G_Q$, where "I" signifies in-phase and "Q" signifies quadrature-phase. The $G_I$ and $G_Q$ signals are added by adders 90 and 92 to multilevel digital signals $DS_I$ and $DS_Q$. This embedding of the analog signals carrying the high frequency information in the digital signal is done in accordance with the methods described in U.S. Pat. No. 4,979,041 issued Dec. 18, 1990 to W.F. Schreiber, entitled "High Definition Television System", and incorporated herein by reference. Note that the peak-to-peak amplitude of the $G_I$ and $G_Q$ signals must be less than half the level spacing of the multilevel digital signals $DS_I$ and $DS_Q$. The two signals containing the embedded analog information are then multiplied in multipliers 94 and 96 by a carrier frequency, $f_c$, and a replica thereof shifted 90 degrees. The products are added in an adder 98 to produce the input signal to the transmitter stage.

Of course, any modulation scheme can be used that enables one to transmit highs by spread spectrum and that transmits lows plus decoding data (also, AM and AS data, if applicable) nearly without error.

Figure 6:
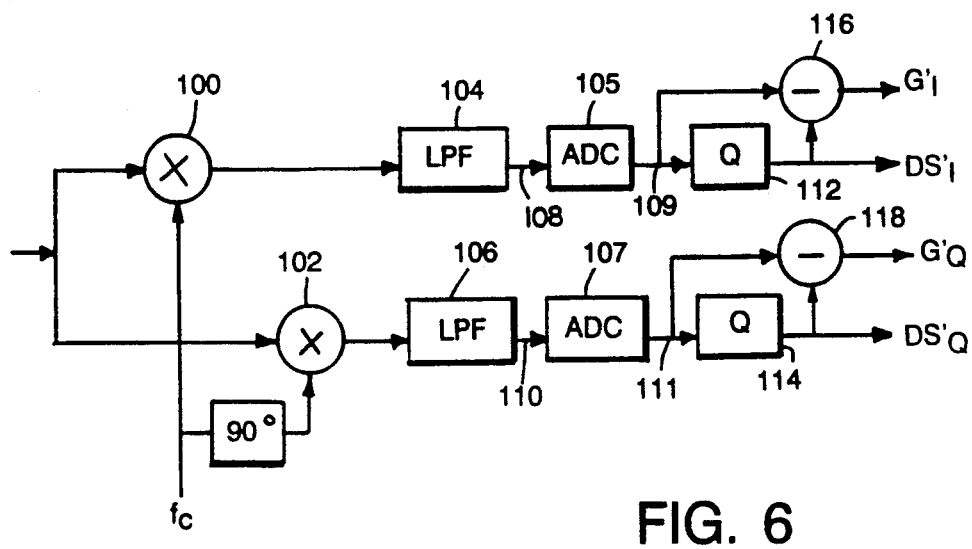
FIG. 6 is a block diagram of a demodulator circuit.

FIG. 6 shows a typical quadrature demodulator which may be used in the system. The received signal is applied to two multipliers 100 and 102, fed respectively by the carrier frequency $f_c$ and a replica thereof shifted 90 degrees. The products produced by multipliers 100 and 102 are passed through lowpass filters 104 and 106, respectively, to remove the carrier frequency signal, thereby producing the baseband signals 108 and 110. Baseband signals 108 and 110 then pass through analog to digital converters (ADC) 105 and 107 to produce digital signals 109 and 111, respectively. In order to separate the multilevel digital signals containing the low-frequency information and other data from signals 109 and 111, the latter pass to quantizers 112 and 114, where they are quantized using the same levels used to produce the multilevel digital signals $DS_1$ and $DS_2$ in the transmitter. The resulting quantized signals are identified as $DS_I'$, representing the in-phase signal, and $DS_Q'$, representing the quadrature phase signal. $DS_I'$ is subtracted from signal 109 by subtractor 116 to obtain a $G_I'$ signal, representing the in-phase highs signal. Similarly, $DS_Q'$ is subtracted from signal 111 by subtractor 118 to obtain a $G_Q'$ signal, representing the quadrature-phase highs signal. The four signals $G_Q'$, $G_I'$, $DS_Q'$ and $DS_I'$ are replicas of the corresponding four signals which were input to the modulator in the transmitter.

What has been described is a hybrid transmission method wherein the spread spectrum signal is superimposed on a digital QAM signal. The invention may be used with any other method of multiplexing the signals that must be transmitted error-free, generally digitally, and those that can experience some degradation (such as by the addition of a small amount of noise) without producing catastrophic loss of image quality. For example, the digital signal can be transmitted by QAM in one subchannel, or the two signals can be transmitted in the same channel by time division multiplexing.

A SPREAD SPECTRUM VERSION OF THE MIT-CC SYSTEM

A spread spectrum version of the MIT-CC system (a channel compatible system developed at the Massachusetts Institute of Technology) will now be described to further illustrate the invention. The MIT-CC system transmits images of 720×1280 active elements per frame at a rate of 60 fps, for an uncoded transmission rate of 55.2 Megapixels/sec. It uses hybrid transmission in which the data that must be substantially error-free is transmitted digitally using 4-QAM at 9.83 Mb/s while the selected subband samples, which need not be error-free, are superimposed on the digital data as analog samples at 9.83 Megasamples/sec. The analog samples are selected from the 55.2 Ms/s of the original signal as those most important to image quality. In the original form of the MIT-CC system, the selected analog samples, which are adaptively modulated and scrambled, are transmitted two-by-two (i.e., two samples per symbol) through the channel. Since it uses a QAM signal, that is equivalent to one-by-one data transmission in each phase of the QAM signal.

Figure 7:
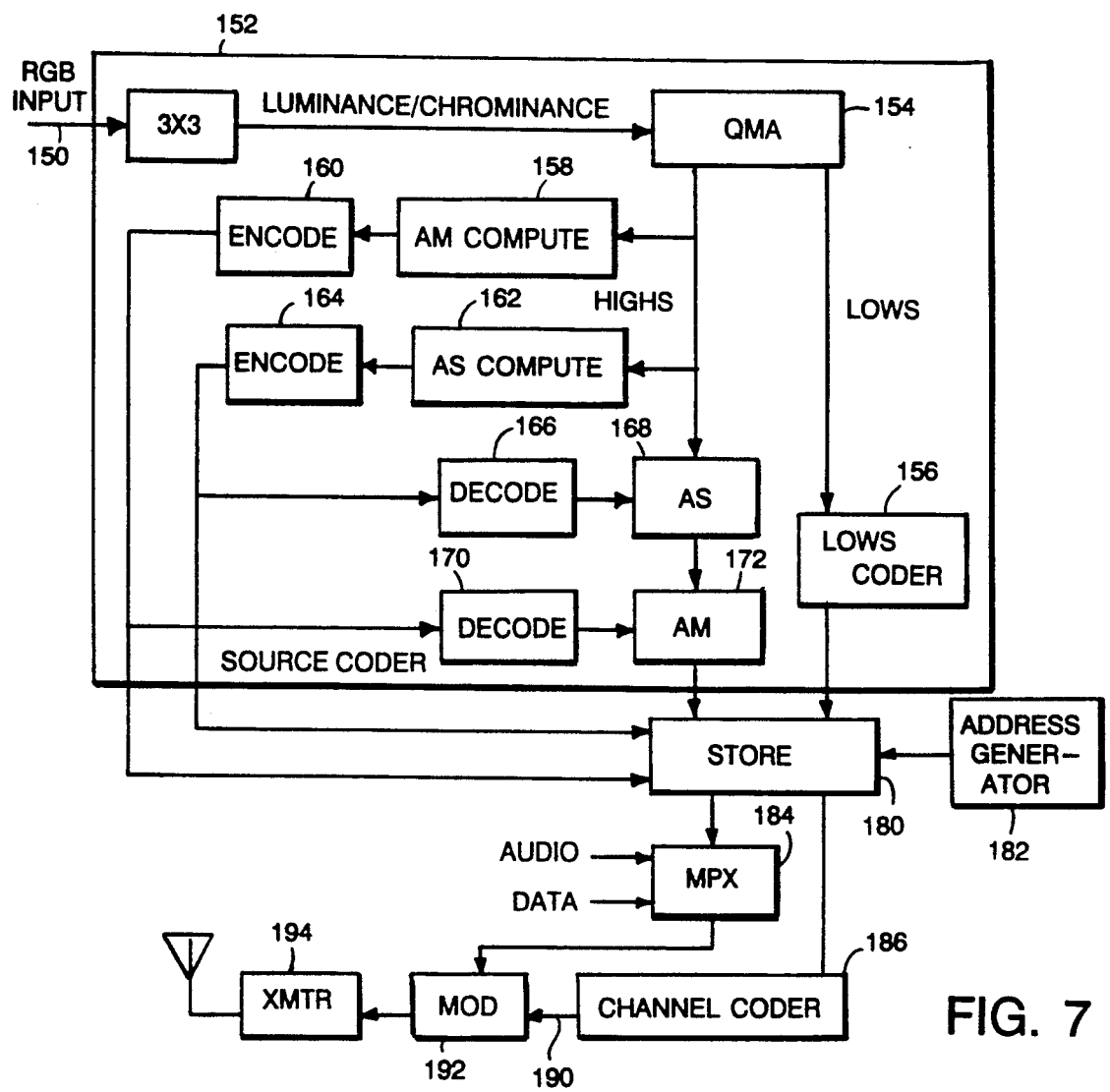
FIG. 7 is a block diagram of a spread spectrum version of the MIT-CC system.

Referring to FIG. 7, in the spread spectrum version of the MIT-CC system, a 3×3 linear matrix 152 processes an RGB high-definition video signal 150 to generate the standard luminance/chrominance form. A quadrature-mirror analysis filter bank 154 uses two-dimensional subband decomposition to divide the spectrum of each video frame into 8×8 (i.e., 64) frequency components, each having dimensions 90×160 pels (see FIG. 8). The lowest frequency components, which are identified by the letter "D" in FIG. 8 are sent error-free at full resolution. That is, they are processed by a lows coder 156 into a digital signal at 4 Mb/s, while the other components are treated separately. Lows coder 156 uses a JPEG (Joint Picture Expert Group) algorithm for coding the lows. See e.g. G.K. Wallace, "Overview of the JPEG Still Picture Compression Algorithm," Elect. Imaging Conference, Boston, Oct. 29–Nov. 1, 1990. Optionally, a forward error correcting code (FEC) may be used on the lows signal.

In the described embodiment, the highest ten frequency components are discarded (i.e., not sent). The remaining blocks, numbering 51 components and representing the highs signal are sent using the spread spectrum techniques described herein.

There are two methods of dealing with the fact that different SNR is required for different samples, according to their frequency. For example, the number of bits/sample may be preassigned to each frequency. Alternatively, an adaptive modulation (AM) process may be used in which the smaller samples are multiplied by larger adaptation factors. To minimize the quantity of side information, each transmitted adaptation factor is used for many samples. At the receiver, each received sample is divided by the appropriate adaptation factor to restore the sample to approximately its original amplitude. The division process also reduces any noise or interference added in the channel. Either method can be used with the invention.

Experience demonstrates that with high-definition TV systems, only about ⅛ or less of all the samples are needed for intraframe coding. Thus, adaptive selection of only these most important samples may be used. Of course, when samples are adaptively selected, their location in the frequency plane or the space plane (both methods are used) must be indicated to the receiver. Such information (referred to as AS data) must be delivered essentially without error, whereas the sample amplitude can suffer small errors without catastrophic effect on the reconstructed image.

In the described embodiment, improved noise performance is achieved by adaptive modulation, and data compression is achieved by adaptive selection of about 10 Ms/s of subband samples out of the 55.2 Ms/s in the original signal. An AM compute module 158 computes the adaptive modulation factors to be applied to the image frame and an AM encoder 160 encodes the AM factors. Similarly, an AS compute module 162 computes the adaptive selection information and an AS encoder 164 encodes the adaptive selection decisions. (The AM and the AS data are each coded to about 2 Mb/s, using the techniques to be described shortly.)

Since some distortion occurs in the coding of these two data streams, they are decoded at the sending end exactly as they are to be decoded at the receiving end, and the reconstructed AM and AS data is used to process the video information by applying both the adaptive modulation factors and the adaptive selection decisions generated for the image. As shown in FIG. 7, an AS decoder 166 decodes the coded adaptive selection information from AS encoder 164 and an AS circuit 168 implements the adaptive selection decisions on the image data. Similarly, an AM decoder 170 decodes the coded adaptive modulation from AM encoder 160 and an AM circuit 172 processes the image data by applying the adaptive modulation factors to the image data. Ultimately, all of the data (i.e., the encoded AM data from AM encoder 160, the encoded AS data from AS encoder 162, the lows data from lows coder 158, and the modified highs data from AM circuit 172) are placed in a store 180 under the control of an address generator 182.

As an optional feature, address generator 182 may implement a scrambling function in accordance with the principles described in U.S. patent application, Ser. No. 07/257,402 to William F. Schreiber, entitled "Reliable Television Transmission Through Analog Channels," filed Oct. 13, 1988, now U.S. Pat. No. 4,040,211, incorporated herein by reference. The scrambling pattern must be known at the receiver, but it need not be transmitted with each image as it does not vary with each image.

Since only 10 to 12% of the samples are sufficient to give very good quality, the minimum required data rate is about 5 to 6 Ms/s (Megasamples/second), leaving analog capacity to spare. This extra capacity is used to reduce the amount of digital data required to specify the selected samples. Of the approximately 10 Mb/s of digital transmission capacity available, approximately 2 Mb/s each are used for adaptive selection and adaptive modulation, and approximately 4 Mb/s is available for RGB lows. The remaining 2 Mb/s sec is for audio, error correction, and ancillary data.

Data is read from store 180 under control of address generator 182 to generate two streams of samples, one stream of samples (identified as stream 183) containing the lows information and the other stream of samples (identified as stream 185) containing the highs information. The lows information is multiplexed in multiplexer (MPX) 184 with audio and ancillary data plus forward error correction (FEC) information, if used. The highs information passes to a channel coder 186 where it is processed using the previously described spread spectrum techniques to produce sum-of-products signals 190. The output of MPX 184 and the sum-of-products signals 190 pass to a modulator 192 where the 9.83 Megabits/sec of digital data is used to form a 4-QAM signal, while the 9.83 Megasamples/sec are converted into analog form and superimposed on the 4-QAM constellation. The digital data budget is 4 Mb/s for lows, 2 Mb/s sec each for AS and AM, and 1.93 Mb/s for synchronization, audio, ancillary data, and FEC, if used.

ADAPTIVE MODULATION

Adaptive modulation is performed in accordance with the principles described in U.S. Pat. No. 4,907,087 to William F. Schreiber, issued on Mar. 6, 1990, incorporated herein by reference. The general idea is to raise the level of the highs components, which are typically very small, especially in the blank areas of the image where noise is most evident. The signals are multiplied by a factor, greater than one, but not so large as to cause channel overload. At the receiver, the components are divided by the same factor, greatly decreasing channel noise. Factors may be assigned to blocks in spatial or spatiotemporal frequency space and the actual factor used at any pel may be chosen by interpolation, both in the transmitter and in the receiver. The block factors are transmitted to the receiver along with other control information.

To implement the adaptive modulation technique in the described embodiment, given the limited digital channel capacity available for sending the AM information, the 51 subbands to be transmitted in analog form are divided into three zones radiating from the origin. The precise assignment of subbands to the different zones is not critical. The general objective is to assign the 51 subbands to the three zones so that each zone contains contiguous subbands and has approximately the same number of subbands associated with it.

Adaptive modulation data is derived for the three subbands that do not use adaptive selection (i.e., the subbands labelled "X" in FIG. 8), and these factors are used for each of the subbands throughout the corresponding zones, but modified according to frequency. AM data is transmitted for the lowest three subbands only, one in each zone, and the AM data for the higher subbands is derived from this, using the methods such as those developed by Warren Chou and David Baylon (See, David M. Baylon, "Adaptive Amplitude Modulation for Transform Subband Coefficients," Master of Science Thesis, Massachusetts Institute of Technology, 1990 and Warren H. Chou, "Methods to Improve Spatiotemporal Adaptive Amplitude Modulation for Video Transmission," Master Of Science Thesis, Massachusetts Institute of Technology, 1990. These methods generally raise the adaptation factor for the higher frequency subbands either linearly with frequency or according to some other rising curve. The parameters of the curve can be determined generally from data taken on a variety of pictures, or can be derived for each picture to be transmitted. In the latter case, the amount of additional data to be transmitted to give these parameters is negligible.

Three (3) bits/pel are used for the AM data, with values 1 to 16 in approximately constant-ratio steps (e.g. 1, 1.49, 2.21, 3.28, 4.88, 7.25, 10.78, and 16.00). The three 90×160 AM images to be transmitted in each frame are divided into 4×4 blocks. The "busier" blocks are transmitted with one datum per sample, while the less busy blocks are transmitted with only one datum per block. "Busy" blocks are taken to be those with rms sample values above a threshold. The threshold is chosen so as to reach the goal of no more than 2 Mb/s. The code for less busy or "blank" blocks is a zero followed by 3 bits for the block factor; the code for "busy" blocks is a one followed by 48 bits for the individual pel factors. There are 900 blocks per 90×160 subband and a total of 2700 every 1/60 sec for the three subbands to be transmitted. If X is the number of blank blocks, 2700-X is the number of busy blocks. X is found from this equation:

$$\{X(4)+(2700-X)49\} \times 60 = 2 \times 10^6.$$

Thus, for example, for each frame there may be 500 busy blocks and 2200 blank blocks. The threshold of busyness is set to achieve this allocation of block types. Note the 500 busiest blocks are selected jointly from the three subbands used in the calculation of each frame.

The effect of this algorithm is that, in blank areas, a low resolution of adaptive modulation is used, while in busy areas, full resolution of AM data is used. Full spatial resolution of AM data gives the best noise performance near edges and in complicated areas in the image. However, in relatively blank areas, lower resolution of AM data is harmless.

A more sophisticated decision can be made about which blocks to choose for high-resolution representation. Such improvements require no change at the decoder and thus may be part of a subsequent upgrade of the system. One effective method is to measure the visually weighted rms noise resulting from treating each block on a low-resolution basis and to choose blocks for high resolution on the basis of maximum noise suppression. This would give better noise performance within the allowance of AM data rate.

ADAPTIVE SELECTION

The following adaptive selection algorithm gives excellent pictures with 7 to 8 Ms/s and approximately 2 Mb/s for the selection data. All of the samples in the three subbands labelled "100" in FIG. 9 are used, so no AS data is required for them. In the remaining 48 subbands, the uncoded selection information is one bit per pel, or 90×160×48×60=41.5 Mb/s. The required compression factor of about 21 is achieved first by dividing the 48 subbands to be coded into 13 groups. Each subband within a group uses the same selection data. A pel is selected if required by any of the subbands in the group.

In the described embodiment, the division of the 48 subbands into the 13 groups is accomplished as shown in FIGS. 9 and 10. FIG. 9 shows the frequency plane with smoothed selection percentages and the grouping plan. The number in each subband represents the average percentage of samples that were selected for that subband. Note that the percentage of selected samples is higher at low frequencies and it falls off rapidly with increasing frequency. The subbands are grouped into the 13 groups using the following two criteria. The subbands within a group should be contiguous. In each group, the ratio of the highest number (i.e., the percentage of selected samples) to the smallest number should be as small as possible. The resulting division of the subbands among the thirteen groups is also shown in FIG. 10 where the assignment of a subband to one of the thirteen groups is shown by the number of the group to which the subband is assigned.

For each group, one set of AS data is used, comprising a 90×160 binary "picture" in which a one means select and a zero means reject. A threshold is found so that the number of individually selected samples in all of the subbands is about half the number of samples to be transmitted, or about 5 Ms/s. The binary selection data for all of the subbands in each group is now subject to a logical OR, so that the single picture for each group has a one at any sample where a one appears in any of the subbands. This increases the number of samples selected, but because of the high correlation of AS data from subband to subband, most of the newly selected samples would have been selected with a lower threshold.

At this point, as an option, isolated samples may be rejected. The resulting thirteen 90×160 AS pictures are then each subdivided into 3×3 blocks. The number of ones in each 3×3 block is then counted and the blocks are divided into three groups, according to the number of ones within the 3×3 blocks. Blocks with one sample are emptied, i.e., no samples are sent for that block. Blocks with more than three samples are filled, i.e., all of the data for that block is sent. The remaining blocks with two or three samples ("sparse" pels) are transmitted exactly. This operation increases the number of selected samples to 8 to 10 Ms/s. If too high or too low, the threshold is adjusted to achieve the desired sample rate. In most cases, it suffices to adjust the threshold only in the next frame.

There are four kinds of 3×3 blocks, namely, empty blocks, full blocks, and blocks including either two or three pels. The most numerous of the full or empty blocks is transmitted as a binary image, using a code such as that of Ziv-Lempel (see J. Ziv and A. Lempel, "A Universal Algorithm for Sequential Data Compression," IEEE Trans. on Information Theory, Vol. IT23, No. 3, May 1977, pp. 337-343). The remaining blocks are transmitted by a zero for full or empty, as the case may be, and a code starting with one for the blocks of two or three. There are 36 ways to arrange two ones in a block of nine and there are 84 ways to arrange three ones in a block of nine. Thus, there is a total of 120 different types of blocks in this remaining group blocks and a 7-bit code may be used to identify which type is being sent. The 7-bit code is appended to the one, signifying that the block has two or three ones. The 7-bit code identifies the particular bock type, i.e., the location of the ones bits in the 3×3 block. With this code and with data obtained from typical 720×1280 images, the AS data for locating about 10 Ms/s can be transmitted in less than 2 Mb/s. Note that this method preserves the full spatial resolution of AS data.

In the described embodiment, pels are selected if they exceed a threshold which is set to give about 8 Ms/s after the procedures just described. This approach gives excellent pictures, apparently because it tends to fill in extra pels near edges or in very busy areas that would have been accepted had the threshold been a little lower. In addition, the provision for sparse pels allows some unstructured texture to be properly rendered.

ADDRESS GENERATOR ALGORITHM

In general, as noted earlier, the number of selected samples decreases monotonically with (magnitude of) frequency. Thus, it is not desirable to use the 51 subband signals directly as components in the spread-spectrum operation since they do not all have the same number of samples per second. Accordingly, address generator 182 regroups the selected samples into a different set of groups, each group having the same number of samples.

More specifically, address generator 182 employs a selection algorithm for sending data to channel coder 186 that separates the samples into a pair of twenty groups arranged in ascending order of spatial frequency. Each of the 40 groups represents 64×64 samples in each frame, and all samples within any one group have approximately the same spatial frequency. Since the frequency plane is 2-dimensional, "frequency" is construed, for the purpose of ordering the samples, to be monotonically related to the sum of the squares of horizontal and vertical frequencies.

The technique for obtaining the required equal-rate components is as follows. First order the original 51 subbands according to frequency. This may be accomplished by assigning integers to each of the subband positions along the two axes and then calculating for each subband the sum of the squares of the two integers that identify the subband location, as in FIG. 11. The numbers from that calculation (shown for each of the subbands in FIG. 11) correspond roughly to the square of the magnitudes of the frequencies associated with each of the subbands. Once the order of the subbands is determined in this manner, the subbands are used in order of rising frequency. When two subbands have the same frequency, selection is done in a clockwise fashion.

The resulting order using this approach is shown in FIG. 12. (All 61 components that might be transmitted by spread spectrum are ordered; however, in the preferred embodiment, recall that the ten highest components are omitted.)

For each subband (component) there exists a 90×160 picture composed of the samples in that subband. After adaptive selection, many samples will have been marked for deletion. The remaining samples are read out from left to right and top to bottom from each subband beginning with the first subband and proceeding in order through the higher-frequency subbands. The samples that are read out are arranged in a one-dimensional array. Thus, all 163,840 samples from each frame form a separate array.

The samples from the one-dimensional array are then used to generate the forty groups, each group being arranged as a 64×64 array. The forty groups are filled sequentially from the one-dimensional array until all samples of the one-dimensional array have been assigned to one of the forty groups. During the assignment, each group is filled from left to right and top to bottom. Note that the members of each group will have about the same frequency, and hence each group will require about the same SNR and will use the same weighting factor when combined within the channel coder to form the sum-of-products signal.

Note that if scrambling is used, it may be applied independently to each 64×64 block as they are read from store 180.

The groups, which can be numbered from 1 to 40 in the order in which they were filled, will also be ordered in frequency. The forty groups are separated into two sets of twenty groups each, one set containing the odd numbered groups and the second set containing the even numbered groups. For transmission, one sample is taken from each group, each being multiplied by one of the 40 orthogonal sequences of length 40. The products are adjusted in relative amplitude, lower frequencies being made larger than the higher frequencies and then added to produce the sum-of-products signals, as previously described. Since there are 40 orthogonal sequences of length 40, there is no cross-talk at the receiver, as a result of which all samples are recovered independently.

Figure 13:
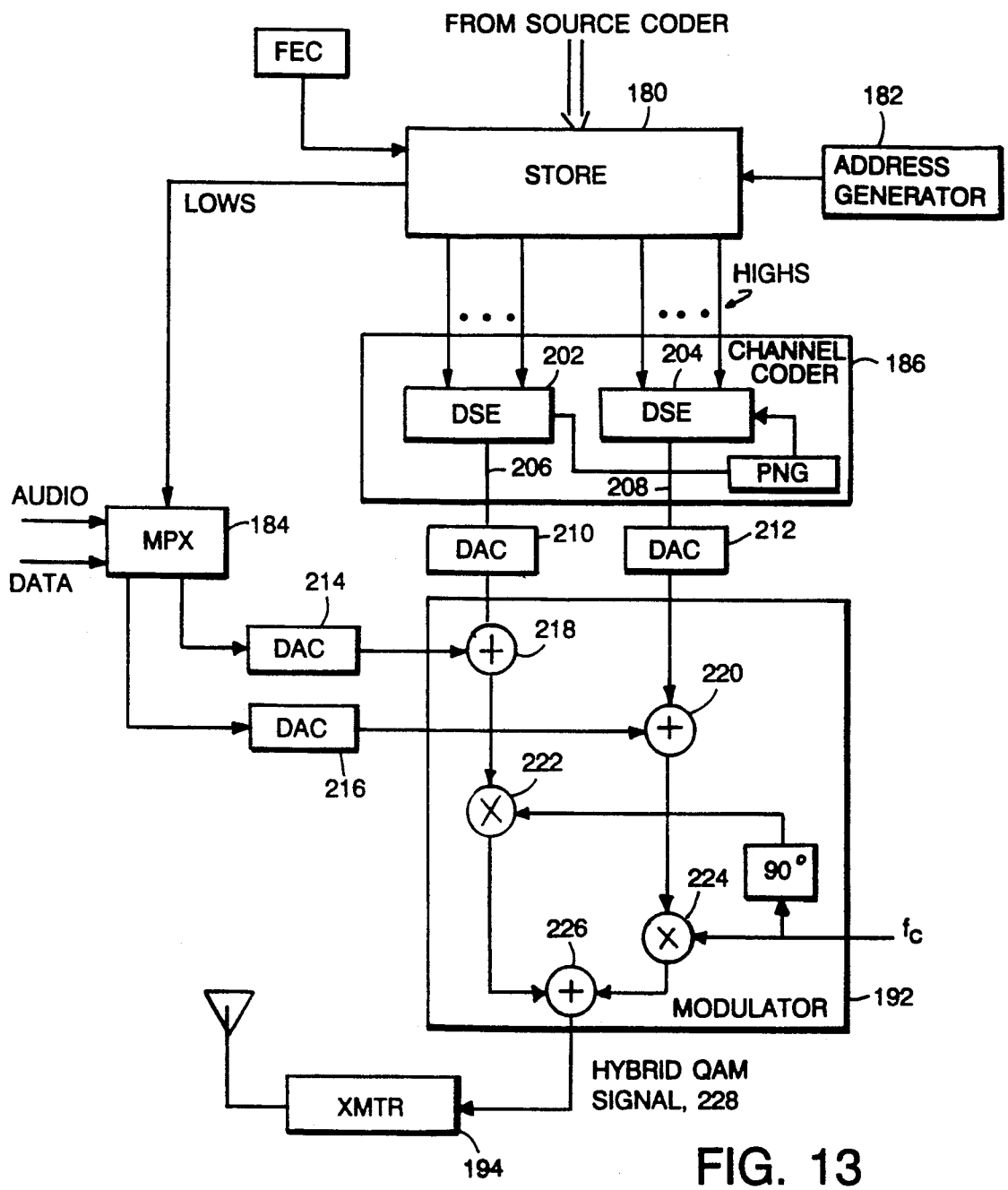
FIG. 13 is a more detailed block diagram of a portion of the transmitter including the channel coder.

The portion of the television system that generates and processes the two streams of samples (i.e., the data streams representing the two groups of 20 samples each) is illustrated in greater detail in FIG. 13. Store 180 operates under the control of address generator 182, as previously described. It receives, stores, and outputs as needed all the data to be transmitted. The described embodiment also includes an FEC generator 21, which processes all the data to be transmitted digitally and provides an error-correction sequence back to store 182. Audio and ancillary data are added to the other digital information in a multiplexer 184 and are assumed to have their own FEC, if required.

Sample data is read from the store, 40 samples at a time, one from each of 40 groups in which the data is arranged in order of increasing spatial frequency. Data from the odd groups goes to a DSE 202 while data from the even groups goes to a DSE 204. Because of the way the data had been placed in the 40 groups, the 20 samples simultaneously input to each DSE 202 and 204 cover the full range of frequency from lowest to highest. Thus, the two groups being processed at any one time have essentially the same frequency distribution. As previously discussed in connection with the weighting of samples, the total permitted power in the output of DSE's 202 and 204 is unequally divided among the 20 products, with lower-frequency products having higher values than higher-frequency products.

Up to this point, all processing has been digital. DSE outputs 206 and 208 are converted into analog form by DACs 210 and 212, respectively. Likewise, two outputs from the multiplexer 184, each of 4.92 Mb/s and comprising the digital data to be transmitted essentially error-free, are converted to two-level signals of value ±1.0, by DACs 214 and 216. The DAC outputs are added in adders 218 and 220 as shown, with the analog sample data being less than ±1.0 (typically ±0.5), the step size of the multilevel digital signal. The output of each of adders 218 and 220 comprises a hybrid signal of 4.92 Mb/s plus 4.92 Ms/s. These two hybrid signals are multiplied in multipliers 222 and 224, respectively, by the carrier frequency and its replica shifted 90 degrees. The outputs of multipliers 222 and 224 are finally added in adder 226 to produce a hybrid QAM signal 228. The latter is directed to transmitter 194, which is just a frequency shifter and amplifier, the output of which is directed to the transmitting antenna. Thus, by using this approach, for each phase of the transmitted QAM signal, 20 samples, one from each group, are transmitted simultaneously by spread spectrum.

Alternatively, more than 9.93 Megasamples/sec can be transmitted, but with some crosstalk, the latter appearing as random noise because of the scrambling of the samples before processing.

Note that some or all of the above-described analog processing can be done digitally, converting the signal to the analog form at a later point. Of course, the circuits which were described would be slightly modified from those illustrated. However, the required modifications would be readily apparent to those skilled in the art.

THE RECEIVER

Figure 14:
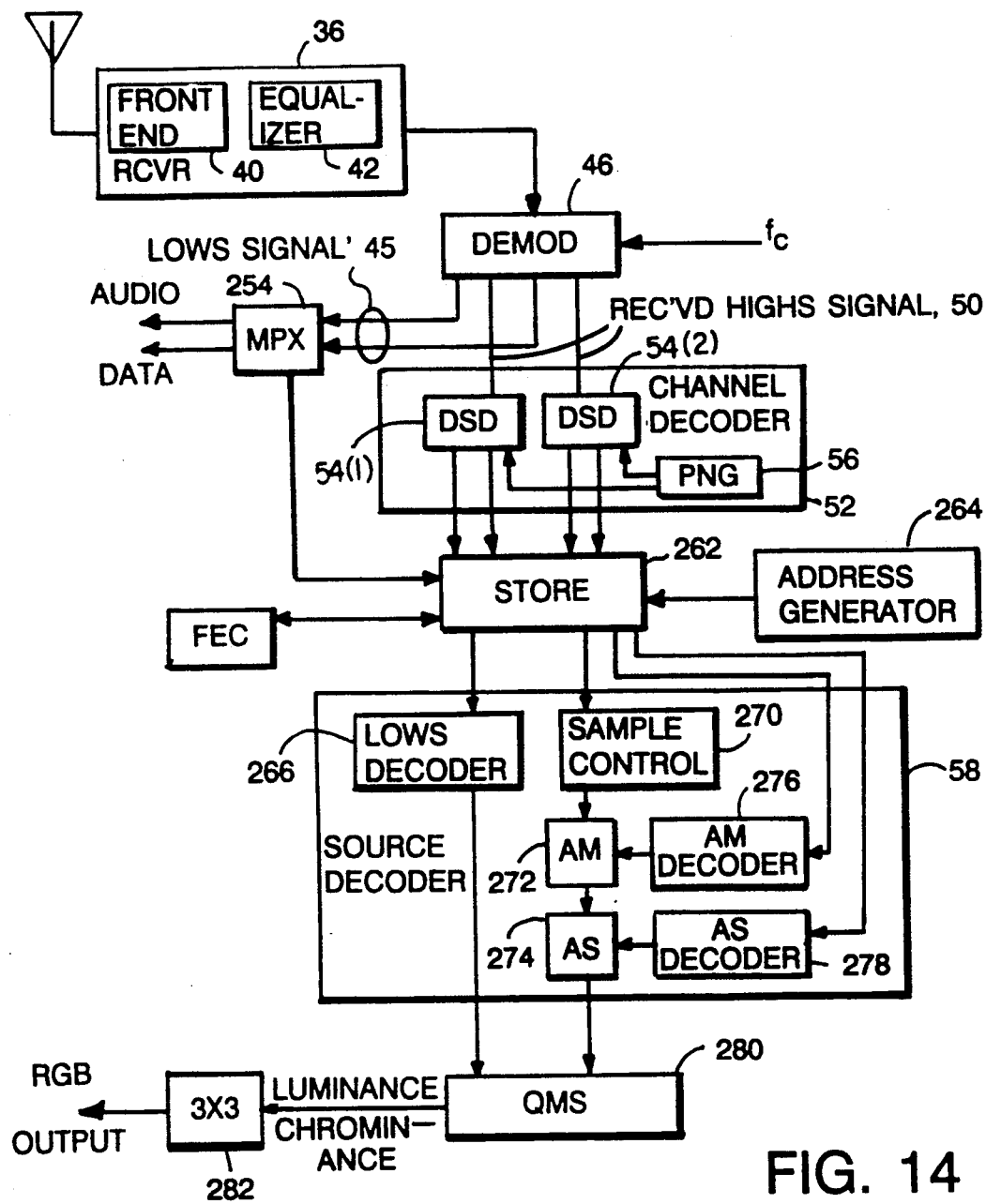
FIG. 14 is a more detailed block diagram of the receiver.

Referring to FIG. 14, the configuration and operation of the receiving end of the system are the inverse of those at the sending end. The received signal passes through the receiver 36 which includes front end 40 and optional equalizer 42, as previously described. The output of receiver 36 goes to demodulator 46 where it is mixed with the carrier frequency to generate two baseband signals, namely, received digital signals 48 and received highs signal 50. The quadrature components of digital signals 48 are processed by a multiplexer 254 which removes the audio and data signals that were added in the transmitter. The quadrature components of highs signals 20 go to channel decoder 50 where two DSD's 54(1) and 54(2) extract the component signals in the manner previously described to generate the two groups of 20 samples each and pass these data streams to channel decoder 52. The demultiplexed lows signal, the output of channel decoder 52, and forward error correcting code data, if applicable, are then stored in a store 262.

The data that was placed in store 262 is then read out of store 262 under the control of an address generator 264. Address generator 264 sends the low frequency information to a lows decoder 266 in source decoder 58 which implements the inverse of lows coder 156 used in the transmitter (see FIG. 7) to generate the spatial frequency components representing the first three blocks (labelled "D" in FIG. 8) of the video spectrum. Address generator 264 also reads out a highs data stream from store 262 and passes it to source decoder 58 where a sample control unit 270 sets certain samples or components to zero when they are found to be too small or too noisy. The output of sample control unit 270 then passes to an adaptive modulation circuit 272 and an adaptive selection circuit 274 which implement the inverse of the adaptive modulation and adaptive selection processes that were performed in the transmitter. Address generator 264 sends the AM and AS data that was transmitted along with the digital video information and placed in store 262. The AM and AS data is required for these decoding processes and so is sent to an AM decoder 276 and an AS decoder 278, respectively.

The output of source decoder 58, representing the spatial frequency components of the video signal, is then processed by a quadrature-mirror synthesis filter 280 which reconstructs the luminance and chrominance video signals from them. Finally, the luminance and chrominance signals pass to a 3×3 matrix circuit 282 which generates the corresponding RGB signals.

To eliminate signals that are too noisy, sample control unit 270 measures the CNR of the particular component or of the signal as a whole. The CNR of the overall signal is readily measured by transmitting a known sequence periodically, such as once per frame. Since the sequence is known, the difference (e.g., rms value or average of the absolute value) between the transmitted and received sequence can be measured and the threshold set as a result. Experience will show what threshold to use for each frequency as a function of overall CNR. Alternatively, at the cost of some additional complication, but with the advantage of higher accuracy, the CNR of each frequency component can be individually measured by periodically transmitting a known sequence for each frequency component. The method of eliminating by amplitude as well as by noisiness can be used simultaneously by setting a minimum threshold value on the basis of signal amplitude, and by raising the threshold when the signal becomes increasingly noisy.

Note that the use of the second technique, i.e., the elimination of components and their associated noise (whether due to crosstalk or channel noise) as a function of CNR has the effect of maximizing image quality at each possible overall CNR, thus producing a graceful fall-off of quality with distance from the transmitter. First assume that the various frequency components are transmitted with relative power levels so that, at high CNR when all transmitted samples are being used to reconstruct the image, optimum quality has been obtained. As the CNR decreases, more and more samples will be eliminated, first from the highest-frequency components and then from lower- and lower-frequency components. Thus the image will always be reconstructed from all the samples that can benefit the image quality. At very low CNR, a low-resolution image will be obtained, which is much better than no image at all. The thresholds can be set so as to achieve a desirable trade-off between noise and sharpness, since lower thresholds will improve sharpness but will result in lower SNR in the reconstructed image.

Other embodiments are within the following claims. For example, an alternative method made possible by this invention is to transmit the deselected samples with zero value in their original position so that no side information is required at the receiver. All subbands now have the same number of samples, and can be used directly as components for the spread-spectrum encoder. Adaptive modulation and scrambling are still used as above. When adaptive modulation is used at the transmitter, a minimum value of selected samples is established.

At the receiver, all samples found to be of less than the minimum value (i.e., they are so small and/or noisy that they would not contribute to picture quality) are set to zero. This eliminates the noise associated with such samples, whether due to channel noise or to crosstalk that results from using more different components than there are orthogonal PN sequences. Elimination by amplitude can be done by passing the samples $x_l$, through $x_m$, (see FIG. 4) through a nonlinear thresholding circuit 250 having transfer characteristics of the type shown in FIG. 15. Note that the signals are bidirectional since they have zero average value. All samples below the threshold value, T, are set to zero, thus eliminating all noise less than T in amplitude. The AM process is so arranged that there are no valid signal levels below T. The value of T is established by measuring the peak signal received for the particular frequency and setting T to a fraction thereof. This technique does not depend on the CNR actually experienced at the receiver. It only eliminates samples (and their associated noise) that cannot help the image quality no matter how high the CNR.

No additional signal distortion occurs under these circumstances from operating the nonlinear circuit; only noise is rejected. This procedure simplifies the receiver considerably and also eliminates the necessity of transmitting the adaptive selection information.

What has been described above is known as direct-sequence spread spectrum. However, other forms of spread spectrum, such as frequency-hopped spread spectrum, have similar characteristics and can be used instead. Also, though a 2-D frequency decomposition was described, the invention also applies to a system which performs a 3-D decomposition (i.e., one which generates spatiotemporal frequency components).

The system as described accepts and delivers normal video signals and uses 2-D frequency decomposition. The invention can also be used with at least two other variants of this arrangement.

In a first variant, the frequency decomposition is 3-D, so that two of the coordinates in the frequency domain are spatial frequencies and one is temporal frequency. For example, in a 60 frame/sec system, 5:1 temporal frequency division is convenient. This means that the data stream is divided into blocks that occur 12 times per second rather than 60 times per second as with 2-D decomposition. With 8:1 spatial-frequency division, there are $64 \times 5 = 320$ subbands in each 1/12-second block. Since, in most cases, successive frames are highly correlated, even less than ⅛ of the subband samples are needed for a given picture quality. The operation of the invention is substantially as described for the 2-D case, any small differences being obvious to a person skilled in the art.

In a second variant, the video signal is processed before being input to the system and after being output from the system, so that the input "video signal" is of lower information content. In this way, greater compression can be obtained, or higher picture quality can be produced at the same data rate. The usual kind of processing is to predict the sample values of each frame of a video signal from its previous history, subtracting the predicted values from the actual values to form what is often called the residual signal.

One method of prediction is to use the previous frame, or some algebraic combination of previous frames as the prediction. In this case, as long as the prediction method and its parameters are known to the receiver/decoder, no additional information need be sent. In another method, a motion-compensated prediction is used, which is generally more effective in reducing the information content of the residual signal. In this case, motion information must be transmitted, quite accurately, in addition to the residual data. This additional data can be added to the low-frequency information that is transmitted digitally, or at least with very high accuracy.

In this technique, the input is differential in nature. In order to prevent catastrophic errors at the decoder, which is essentially an integrator in this case, either the transmission must be practically error free or the residual signal must not have a dc component, or both. This is not a severe restriction on the use of prediction with the invention, since the preferred mode of operation is to transmit the dc and low-frequency data separately, and not mixed with the highs signals.

What is claimed is:

1. A noise-reduced method of transmitting a video signal comprising:
   separating the video signal into a plurality of frequency subbands, said plurality of frequency subbands representing a corresponding plurality of subband images, each of said plurality of subband images made up of a corresponding array of blocks of samples;
   for a preselected one of said subband images, measuring the busyness of each of the blocks of that subband image;
   for said preselected one of said subband images, assigning each of the blocks of that subband image to one of a plurality of groups, said plurality of groups including a first group of blocks and a second group of blocks, said blocks in said first group being busier than said blocks in said second group;
   adaptively modulating the samples of the preselected subband image by multiplying the preselected subband image by a set of adaptive modulation factors, wherein a greater quantity of adaptive modulation factors is used for the blocks assigned to the first group of blocks as compared to the blocks assigned to the second group of blocks; and
   transmitting the adaptively modulated preselected subband image along with the set of adaptive modulation factors corresponding thereto.

2. The noise-reduced method of claim 1 wherein the frequency subband components are spatiotemporal frequency subband components.

3. The noise-reduced method of claim 1 wherein said preselected subband image is devoid of any DC signal components.

4. The noise-reduced method of claim 1 wherein the blocks are of uniform size.

5. The noise-reduced method of claim 1 wherein each block is a 4×4 array of samples.

6. The noise-reduced method of claim 1 wherein the total number of adaptive modulation factors in said set of adaptive modulation factors is no greater than a predetermined value.

7. The noise-reduced method of claim 1 wherein the step of adaptively modulating comprises using one adaptive modulation factor per block for the samples of blocks in the second group and using one adaptive modulation factor per sample for the samples of blocks in the first group.

8. The noise-reduced method of claim 7 wherein each block is a 4×4 array of samples.

9. The noise-reduced method of claim 1 wherein the busyness is measured by measuring the RMS value of the signal within a block.

10. The noise-reduced method of claim 1 further comprising adaptively modulating other subband images from said plurality of subband images by using adaptive modulation factors that are derived from said set of adaptive modulation factors.

11. The noise-reduced method of claim 1 further comprising scrambling the samples of the adaptively modulated subband image before transmitting them.

12. A noise-reduced method of transmitting a video signal comprising:
    separating the video signal into a plurality of frequency subbands, said plurality of frequency subbands representing a corresponding plurality of subband images, each of said plurality of subband images made up of a corresponding array of blocks of samples;
    organizing said plurality of frequency subbands into more than one collection;
    for each of said collections and for a preselected one of said subband images within that collection, measuring the busyness of each of the blocks of the preselected subband image in that collection;
    for each of said preselected subband images, assigning each of the blocks of that selected subband image to one of a plurality of groups, said plurality of groups including a first group of blocks and a second group of blocks, said blocks in said first group being busier than said blocks in said second group.
    for each of said preselected subband images, adaptively modulating the samples of that preselected subband image by multiplying that preselected subband image by a corresponding set of adaptive modulation factors, wherein a greater quantity of adaptive modulation factors is used for the blocks assigned to the first group of blocks as compared to the blocks assigned to the second group of blocks; and
    transmitting the adaptively modulated preselected subband images along with the sets of adaptive modulation factors corresponding thereto.

13. A method of processing a noise-reduced, transmitted video signal comprising:
    receiving a plurality of adaptively modulated subband images, each of said plurality of adaptively modulated subband images made up of an array of blocks of samples;
    receiving adaptive modulation information for a selected one of said plurality of adaptively modulated subband images;
    from said adaptive modulation information, extracting a set of adaptive demodulation factors and directions for applying the set of adaptive demodulation factors to the selected adaptively modulated subband image to adaptively demodulate the selected adaptively modulated subband image;
    using the adaptive modulation information to identify which of said blocks in the selected adaptively modulated subband image belong to a first group of blocks and which of said blocks belong to a second group of blocks, said blocks in said first group being busier than said blocks in said second group; and
    adaptively demodulating the selected adaptively modulated subband image by using the set of adaptive demodulation factors according to the directions for applying the set of adaptive demodulation factors,
    wherein the step of adaptively demodulating further comprises, for the blocks in the first group of blocks, using a greater quantity of the set of adaptive demodulation factors per block to adaptively demodulate as compared to the blocks in the second group of blocks.

14. The method of claim 13 further comprising adaptively demodulating each of the other of said plurality of adaptively modulated subband images in the same way as the selected adaptively modulated subband image is adaptively demodulated and by using the adaptive modulation information for the selected one of said plurality adaptively modulated subband images.

15. The method of claim 14 wherein the blocks are of uniform size.

16. The method of claim 15 wherein each block is a 4×4 array of samples.

17. The method of claim 14 wherein the step of adaptively demodulating comprises using one adaptive demodulation factor per block for the samples of blocks in the second group and using one adaptive demodulation factor per sample for the samples of blocks in the first group.

18. A bandwidth-reduced method of transmitting a video signal comprising:
    separating the video signal into a plurality of frequency subbands, said plurality of frequency subbands representing a corresponding plurality of subband images, each of said plurality of subband images made up of a corresponding array of subband image samples;
    separating the plurality of subbands into groups;
    for a selected one of said groups, deriving adaptive selection rules for adaptively selecting subband image samples of one of the subbands of the selected group, said adaptive selection rules derived from, all of the subbands of the selected group;
    using the derived adaptive selection rules to adaptively select subband image samples in all subbands of the selected group; and
    transmitting the adaptively selected subband image samples.

19. The bandwidth-reduced method of claim 18 wherein the deriving step comprises:
    for each of said members of the selected group, generating preliminary selection rules for selecting the samples of that member; and
    taking the logical OR of the preliminary selection rules for all of the members of the selected group;

wherein said derived selection rules are derived from the logical OR of the preliminary selection rules for all of the members of the selected group.

20. The bandwidth-reduced method of claim 18 wherein each of the groups is formed by one or more subbands that are adjacent to each other in frequency space.

21. The bandwidth-reduced method of claim 18 further comprising for each of said subbands, generating preliminary selection rules for selecting the samples of that subband, and wherein the step of separating the subbands into groups is done so as to group together subbands having similar percentages of selected samples.

22. The bandwidth-reduced method of claim 18 further comprising scrambling the selected samples before transmitting them.

23. A bandwidth-reduced method of transmitting a video signal comprising:
    separating the video signal into a plurality of frequency subbands, said plurality of frequency subbands representing a corresponding plurality of subband images, each of said plurality of subband images made up of a corresponding array of subband image samples;
    dividing a selected one of said subband images into a plurality of blocks of uniform size;
    adaptively selecting the samples of the selected on of said subband images;
    categorizing the blocks of said plurality of blocks into at least three categories including a first category, a second category and a third category, said first category including blocks having a number of adaptively selected samples less than a first threshold, said third category including blocks having a number of adaptively selected samples greater than a second threshold, and said second category including blocks having a number of selected samples that is at least as great of the first threshold and no greater than the second threshold; and
    transmitting the selected samples of the blocks within the second category using a code that uniquely identifies the pattern of selected samples in each block.

24. The method of claim 23 further comprising transmitting all of the samples of the blocks within the third category.

25. The method of claim 23 wherein each block is a 3×3 block of samples.

26. The method of claim 25 wherein the second threshold is three samples.

27. The method of claim 25 wherein the first threshold is equal to two samples.

28. The method of claim 23 further comprising transmitting none of the samples of the blocks in the first category.

29. The method of claim 23 further comprising:
    transmitting none of the samples of the blocks in the first category; and
    transmitting all of the samples of the blocks within the third category.

30. The method of claim 29 further comprising identifying which of the first and third categories has the most number of blocks, and wherein the step of transmitting the blocks of the category having the most blocks uses a compression code.

31. The method of claim 30 wherein all of the blocks in the second category and all of the blocks from whichever of the first and third categories has the least number of blocks are transmitted together using a unique code for each distinct pattern.

32. The method of claim 30 wherein the compression code is a Ziv Lempel code.

33. The method of claim 23 further comprising scrambling the selected samples before transmitting them.

* * * * *

UNITED STATES PATENT AND TRADEMARK OFFICE
CERTIFICATE OF CORRECTION

PATENT NO. : 5,285,470

DATED : February 8, 1994

INVENTOR(S) : William F. Schreiber

It is certified that error appears in the above-identified patent and that said Letters Patent is hereby corrected as shown below:

Col. 1, line 5, please insert --This invention was made with government support under Contract No. MDA902-90-C-0015 by DARPA. The government has certain rights in the invention.--

Signed and Sealed this

Twentieth Day of September, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,285,470

DATED : February 8, 1994

INVENTOR(S) : William F. Schreiber

Page 1 of 3

It is certified that error appears in the above-indentified patent and that said Letters Patent is hereby corrected as shown below:

Cover page, under [56] References Cited, OTHER PUBLICATIONS, the "Chow" reference, "Spatiotempoal" should be --Spatiotemporal--.

Cover page, under [56] References Cited, OTHER PUBLICATIONS, the "Haber" reference, "Trandmission" should be --Transmission--.

Cover page, under [56] References Cited, OTHER PUBLICATIONS, the "Haber" reference, "vol." should be --Vol.--.

Cover page, under [56] References Cited, OTHER PUBLICATIONS, the "Pickholtz" and "Scholtz" references, "vol." should be --Vol.--.

Col. 3, line 2, after "The", delete "the".

Col. 3, line 51, "t0" should be --to--.

UNITED STATES PATENT AND TRADEMARK OFFICE
CERTIFICATE OF CORRECTION

PATENT NO. : 5,285,470
DATED : February 8, 1994
INVENTOR(S) : William F. Schreiber It is certified that error appears in the above-indentified patent and that said Letters Patent is hereby corrected as shown below:

Col. 5, line 4, "Ziv Lengel cole" should be --Ziv-Lempel code--.

Col. 5, line 5, "th" should be --the--.

Col. 5, line 56, after "Fig. 9", delete ",".

Col. 6, line 23, "exanded" should be --expanded--.

Col. 9, line 17, after "Hz", insert --.--.

Col. 9, line 43, after "$\{PN_i\}$", insert a space.

Col. 9, line 48, after "DSE 20" insert --.--.

Col. 12, line 25, "patent application" should be --Patent Application--.

Col. 15, line 30, "bock" should be --block--.

UNITED STATES PATENT AND TRADEMARK OFFICE
CERTIFICATE OF CORRECTION

PATENT NO. : 5,285,470

DATED : February 8, 1994

INVENTOR(S) : William F. Schreiber

It is certified that error appears in the above-indentified patent and that said Letters Patent is hereby corrected as shown below:

Col. 19, line 24, "$x_1$," should be --$x_1'$--.

Col. 19, line 25, "$x_m$," should be --$x_m'$--.

Col. 21, line 47, after "group", delete --.--, and insert --,--.

Col. 22, line 56, after "from" delete --,--.

Col. 23, line 29, "on" should be --one--.

Col. 24, line 35, "Ziv Lempel" should be --Ziv-Lempel--.

Signed and Sealed this

Twenty-eighth Day of November 1995

Attest:

BRUCE LEHMAN

Attesting Officer

Commissioner of Patents and Trademarks